United States Patent
Yang

(10) Patent No.: US 7,782,957 B2
(45) Date of Patent: Aug. 24, 2010

(54) MOTION ESTIMATION CIRCUIT AND OPERATING METHOD THEREOF

(75) Inventor: Hsing-Chien Yang, Taichung (TW)

(73) Assignee: Novatek Microelectronics Corp., Hsinchu (TW)

(*) Notice: Subject to any disclaimer, the term of this patent is extended or adjusted under 35 U.S.C. 154(b) by 1192 days.

(21) Appl. No.: 11/308,371

(22) Filed: Mar. 20, 2006

(65) Prior Publication Data

US 2007/0002950 A1    Jan. 4, 2007

(30) Foreign Application Priority Data

Jun. 15, 2005   (TW) .............................. 94119772 A

(51) Int. Cl.
    *H04B 1/66* (2006.01)
(52) U.S. Cl. .................. 375/240.24; 375/240
(58) Field of Classification Search ............ 375/240.24
    See application file for complete search history.

(56) References Cited

U.S. PATENT DOCUMENTS

| | | | | |
|---|---|---|---|---|
| 5,005,078 A * | 4/1991 | Gillard | ........................ | 348/452 |
| 5,235,537 A * | 8/1993 | McWhirter et al. | .......... | 708/200 |
| 5,737,020 A * | 4/1998 | Hall et al. | ................. | 375/240.2 |
| 5,949,486 A * | 9/1999 | Ishihara et al. | ............ | 348/402.1 |
| 6,055,270 A * | 4/2000 | Ozkan et al. | ........... | 375/240.03 |
| 6,055,272 A * | 4/2000 | Kim | ....................... | 375/240.23 |
| 6,122,317 A * | 9/2000 | Hanami et al. | .......... | 375/240.16 |
| 6,373,893 B1 * | 4/2002 | Midorikawa | ........... | 375/240.16 |
| 6,380,987 B1 * | 4/2002 | Kametani | .................. | 348/699 |
| 6,516,031 B1 * | 2/2003 | Ishihara et al. | ......... | 375/240.16 |
| 6,567,469 B1 * | 5/2003 | Rackett | ................. | 375/240.16 |
| 6,650,688 B1 * | 11/2003 | Acharya et al. | ............. | 375/141 |
| 6,765,965 B1 * | 7/2004 | Hanami et al. | ......... | 375/240.16 |
| 7,126,991 B1 * | 10/2006 | Mimar | ................... | 375/240.16 |
| 7,245,651 B1 * | 7/2007 | Miao et al. | ................... | 375/147 |
| 2002/0009144 A1 * | 1/2002 | Ishihara et al. | ........... | 375/240.16 |
| 2003/0016748 A1 * | 1/2003 | Hwang et al. | .......... | 375/240.12 |
| 2003/0095603 A1 * | 5/2003 | Lan et al. | ............... | 375/240.17 |
| 2003/0198295 A1 * | 10/2003 | Chen et al. | ............. | 375/240.16 |
| 2004/0172433 A1 * | 9/2004 | Acharya et al. | ............. | 708/300 |
| 2005/0013366 A1 * | 1/2005 | Gallant et al. | .......... | 375/240.16 |
| 2005/0105615 A1 * | 5/2005 | El-Maleh et al. | ....... | 375/240.12 |
| 2005/0190844 A1 * | 9/2005 | Kadono et al. | ......... | 375/240.16 |
| 2005/0207494 A1 * | 9/2005 | Ahn et al. | ............... | 375/240.16 |
| 2005/0238098 A1 * | 10/2005 | Fandrianto et al. | ..... | 375/240.12 |
| 2005/0249284 A1 * | 11/2005 | Lee et al. | ............... | 375/240.16 |
| 2005/0276329 A1 * | 12/2005 | Adiletta et al. | ......... | 375/240.16 |

(Continued)

*Primary Examiner*—Chieh M Fan
*Assistant Examiner*—Santiago Garcia
(74) *Attorney, Agent, or Firm*—Jianq Chyun IP Office

(57) ABSTRACT

The present invention provides a motion estimation circuit and an operating method thereof. The motion estimation circuit includes processing elements $PE_m$ ($-n \leq m \leq n$, n represents a search range), data latches $FF_k$ ($-n < k \leq n$) and selection circuits $MUX_h$ ($-1 \leq h \leq 1$). The processing element receives a current block data and the corresponded block data in a search window and performs a comparison operation on the two block data. The output-end of $FF_k$ is coupled to an input-end of $FF_{k+1}$ and a first input-end of $PE_k$. The output-end of $MUX_h$ is coupled to a second input-end of $PE_h$. Wherein, each 4×4-pixel sub block of the current block is input into $PE_{-n}$ and $FF_{-(n-1)}$, the left sector of the sub-search-window SW' is input into the second input-ends of $PE_{-n} \sim PE_{-2}$ and the first input-end of $MUX_h$, and the right sector of the sub-search-window SW' is input into the second input-ends of $PE_2 \sim PE_n$ and $MUX_h$.

20 Claims, 10 Drawing Sheets

U.S. PATENT DOCUMENTS

| | | | |
|---|---|---|---|
| 2005/0286641 A1* | 12/2005 | Cao | 375/240.26 |
| 2006/0098740 A1* | 5/2006 | Byun et al. | 375/240.16 |
| 2006/0120455 A1* | 6/2006 | Park et al. | 375/240.16 |
| 2006/0198445 A1* | 9/2006 | Li et al. | 375/240.17 |
| 2006/0203908 A1* | 9/2006 | Chuang | 375/240.12 |
| 2006/0285597 A1* | 12/2006 | Gupta et al. | 375/240.17 |
| 2007/0071101 A1* | 3/2007 | Topham | 375/240.16 |
| 2007/0071107 A1* | 3/2007 | Ha | 375/240.24 |
| 2007/0110164 A1* | 5/2007 | Yang | 375/240.24 |
| 2007/0121728 A1* | 5/2007 | Wang et al. | 375/240.18 |
| 2007/0127577 A1* | 6/2007 | Tourapis et al. | 375/240.16 |
| 2007/0217515 A1* | 9/2007 | Wang et al. | 375/240.17 |
| 2008/0298692 A1* | 12/2008 | Guo et al. | 382/232 |
| 2009/0257493 A1* | 10/2009 | Ye et al. | 375/240.12 |
| 2010/0074336 A1* | 3/2010 | Goor et al. | 375/240.16 |

* cited by examiner

MOTION ESTIMATION CIRCUIT AND OPERATING METHOD THEREOF

CROSS-REFERENCE TO RELATED APPLICATION

This application claims the priority benefit of Taiwan application serial no. 94119772, filed on Jun. 15, 2005. All disclosure of the Taiwan application is incorporated herein by reference.

BACKGROUND OF THE INVENTION

1. Field of Invention

The present invention relates to motion estimation, and particularly to a motion estimation circuit having a systolic array architecture and the operating method thereof.

2. Description of the Related Art

In general, the data amount of digital video is tremendously huge. To save the space for storing video data and the transmission bandwidth during transmitting video data, a video data compression must be implemented. To achieve the goal of reducing data, redundant information in a video data needs to be removed. For example, if a previous picture (or a "frame") is similar with the next frame, the previous frame can be kept and the same contents in the next frame are removed; i.e. only the different information is kept. In this way, the data amount of a digital video is able to be significantly reduced. For instance, MPEG video compression standard is one of the most useful video encoding methods.

FIG. 1 is a schematic diagram briefly showing motion estimation operation for a normal video compression. Referring to FIG. 1, to compare a current frame CF with a previous frame PF, the current frame CF is normally divided into a plurality of image blocks (the image block PM in the figure is one of them). A typical size of an image block is 16×16 pixels or 8×8 pixels. Then, an image block PM (called "current image block", even briefly "current block") is one-by-one selected from the current frame and searched a most similar image block in the PF. To conduct the search, a search window in the PF should be defined; that is, in the PF a same-sized block PS is taken as a central point at a same position corresponding to the position of the image block PM in the current frame CF, and from the block PS extends a square area with a predetermined distance n at four sides is chosen as the search window. The above-mentioned predetermined distance is the search range. In the search window, an image block same-sized as the current image block PM is arbitrarily chosen (for example, the block PS is one of them) and a matching operation between the current image block PM and the chosen block is conducted for finding out the most similar image block. Such scheme is termed as motion estimation.

Generally, an SAD (sum of absolute difference) of pixel-to-pixel is calculated when comparing a current image block with a reference image block. In other words, all pixel data in the current image block are subtracted from the corresponded pixel data of the reference image block to obtain every difference of all pixels, followed by taking the absolute values thereof and doing summation of all absolute values. An SAD between the current image block and the reference block is obtained hereto. Whether the current image block and the reference image block are similar can be determined by the SAD value.

Since the motion estimation arbitrarily chooses a block same-sized as the current image block in the search window and a plurality of the chosen blocks is one-by-one compared with the current image block, it is obvious that the amount of the computation (or the computation time) thereof is tremendously large. On the other hand, a motion estimation circuit to efficiently meet such large computation is considerably complicated.

In particular, the newly revised standard H.264 has added image blocks with sizes of 8×16 pixels, 16×8 pixels, 8×4 pixels, 4×8 pixels and 4×4 pixels; the conventional technique fails to simultaneously compute SADs for image blocks with different sizes. Furthermore, the conventional technique is only capable computing individually image blocks with 16×16 pixels or 8×8 pixels and fails to support motion estimation in the form of a tree structure.

SUMMARY OF THE INVENTION

An object of the present invention is to provide a motion estimation circuit based on the systolic array architecture to enhance algorithm efficiency; wherein, a 4×4 pixel image block is taken as the basic unit for motion estimation. In this way, the motion estimation circuit of the present invention is able to support the standard H.264 and the motion estimation with tree structure and significantly reduces the number of selection circuits in a systolic array. Instead, only three selection circuits are needed for switching the data in left/right sector of the sub search windows.

Another object of the present invention is to provide an operating method of the motion estimation circuit so that the present invention can be exercised to a maximum degree.

The present invention provides a motion estimation circuit used for searching and deciding a block most similar to the current block exists in the searching window or not, wherein the current block (i.e. the current image block, or the current pixel block) is comprised of at least one 4×4-pixel sub block. The motion estimation circuit includes a plurality of processing elements $PE_m$, a plurality of data latches $FF_k$ and a plurality of selection circuits $MUX_h$. Wherein, $PE_m$ denotes an m-th processing element, m is an integer larger than or equal to $-n$ but less than or equal to n; n denotes a search range value corresponding to the current block in the search window and n is an integer larger than 0; $FF_k$ denotes k-th data latch and k is an integer larger than $-n$ but less than or equal to n; $MUX_h$ denotes an h-th selection circuit and h is an integer larger than or equal to $-1$ but less than or equal to 1. Each processing element has at least one first input end, at least one second input end and at least one output end, used for respectively receiving the current block and the corresponded block in the search window, doing comparison operation on the both blocks and outputting the result of the comparison operation. The output end of the data latch $FF_k$ is coupled to the input end of the data latch $FF_{k+1}$ and the first input end of the processing element $PE_k$. The selection circuit has a first input end, a second input end and an output end, used for selecting whether the first input end or the second input end is to couple to the output end. The $MUX_h$ output end is coupled to the second input end of $PE_h$. Wherein, each 4×4-pixel sub block of the current block is, in a first sequence and one-by-one manner, input into the first input end of $PE_{-n}$ and the input end of $FF_{-(n-1)}$; the data of partial pixel elements in the search window is in a second sequence input into the second input end of $PE_r$ and the first input end of $MUX_h$; the data of the rest partial pixel elements in the search window is in a third sequence input into the second input end of $MUX_h$; where, r is an integer larger than or equal to $-n$ but less than $-1$ and s is an integer larger than 1 but less than or equal to n.

According to the motion estimation circuit described in the embodiments of the present invention, the above-mentioned processing element is a sum of absolute difference circuit (SAD circuit) and the comparison computation is a sum of absolute difference computation (SAD computation). The SAD circuit includes, for example, an absolute difference circuit (AD circuit), a first adder, a first register and a first selection circuit. The AD circuit receives the current block and the partial blocks in the search window and outputs absolute difference data. The first adder receives the absolute difference data, sums the received absolute difference data and the first accumulation data and outputs the summation result as the first sum. The first register may not have reset function, but receives and latches the first sum in a predetermined sequence and then outputs the first SAD data. The first selection circuit receives and selects either the first SAD data or zero value, then outputs the chosen data as the first accumulation data.

The present invention provides an operating method of the above-described motion estimation circuit. The method includes the steps as follows. First, a 4×4-pixel sub block in the current block is in the first sequence selected. Next, a sub search window in the search window (SW) is defined and the sub search window has a position corresponding to the 4×4-pixel sub block in the current block and a search range defined with a predetermined search range value. The sub search window is virtually comprised of a first sector of the sub search window and a second sector of the sub search window. Further, according to a clock signal timing, each pixel element data in the chosen 4×4-pixel sub block is, in row-by-row and pixel-by-pixel manner, input into the first input end of PE-n and the input end of $FF_{-(n-1)}$. Besides, after finishing the data input of the previous row's pixel elements plus a delay of (n−2) clock signal cycles, a data input of the next row's pixel elements is started. Furthermore, as the first pixel element data of the chosen 4×4-pixel sub block starts to be input, each pixel element data in the first sector of the sub window is, according to the clock signal timing and in row-by-row and pixel-by-pixel manner, subsequently input into the second input end of $PE_r$ and the first input end of $MUX_h$, where r is an integer larger than or equal to −n but less than −1. Finally, as the first pixel element data in the first sector of the sub window starts to be input plus in a delay of (n+2) clock signal cycles, each pixel element data in the second sector of the sub window starts, according to the clock signal timing and in row-by-row and pixel-by-pixel manner, to be subsequently input into the second input end of $PE_s$ and the second input end of $MUX_h$, where s is an integer larger than 1 but less than or equal to n.

According to the operating method of the motion estimation circuit described in the embodiments of the present invention, the method further includes the steps to control the selection circuits. From starting to input the first pixel element data in the second sector of the sub search window, in every (n+2) clock signal cycle, the selection circuit $MUX_{-1}$ would select and output the signal at the second input end within at least one consecutive clock signal cycle and select and output the signal at the first input end during the rest time. Similarly, from starting to input the first pixel element data in the second sector of the sub search window, in every (n+2) clock signal cycle, the selection circuit $MUX_0$ would select and output the signal at the second input end within at least two consecutive clock signal cycles and select and output the signal at the first input end during the rest time. Besides, from starting to input the first pixel element data in the second sector of the sub search window, in every (n+2) clock signal cycle, the selection circuit $MUX_1$ would select and output the signal at the second input end within at least three consecutive clock signal cycles and select and output the signal at the first input end during the rest time.

Since the present invention uses systolic array architecture to perform computations of the motion estimation and uses a 4×4-pixel block as the basic unit for the motion estimation, the present invention is able to support the standard H.264 and the tree structured motion estimation. In addition, the present invention significantly reduces the number of selection circuits in a systolic array, which only three selection circuits are needed for switching the data in the left/right sector of the sub search windows. Each processing element in the motion estimation circuit of the present invention is used for computing, registering and accumulating the sum of absolute difference (SAD) for each 4×4-pixel sub block in the current block and the corresponded 4×4-pixel block in the search window, respectively. The SAD result for the current block and the corresponded block in the search window is also output by each processing element, respectively. Wherein, the current block can be image blocks with sizes of 1 6×16 pixels, 8×16 pixels, 16×8 pixels, 8×8 pixels, 8×4 pixels, 4×8 pixels and 4×4 pixels.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

FIG. 4B is a schematic diagram showing a 4×4-pixel sub block of the current image block in FIG. 4A and a corresponded sub search window in the search window.

FIG. 5 is a schematic timing diagram for inputting data into the motion estimation circuit in FIG. 3 according to an embodiment of the present invention.

DESCRIPTION OF THE EMBODIMENTS

Figure 1:
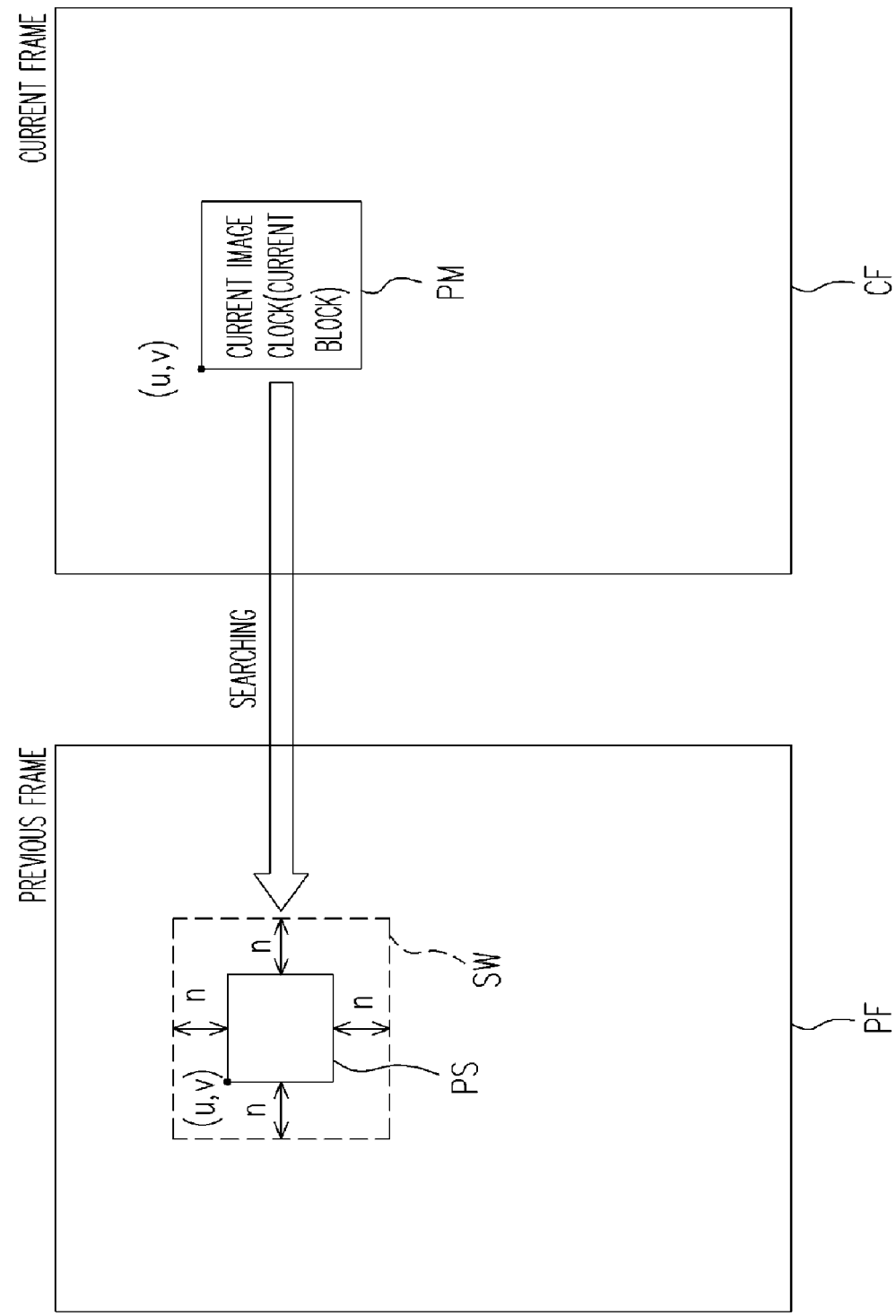
FIG. 1 is a schematic diagram briefly showing motion estimation operation for a normal video compression.
Figure 2:
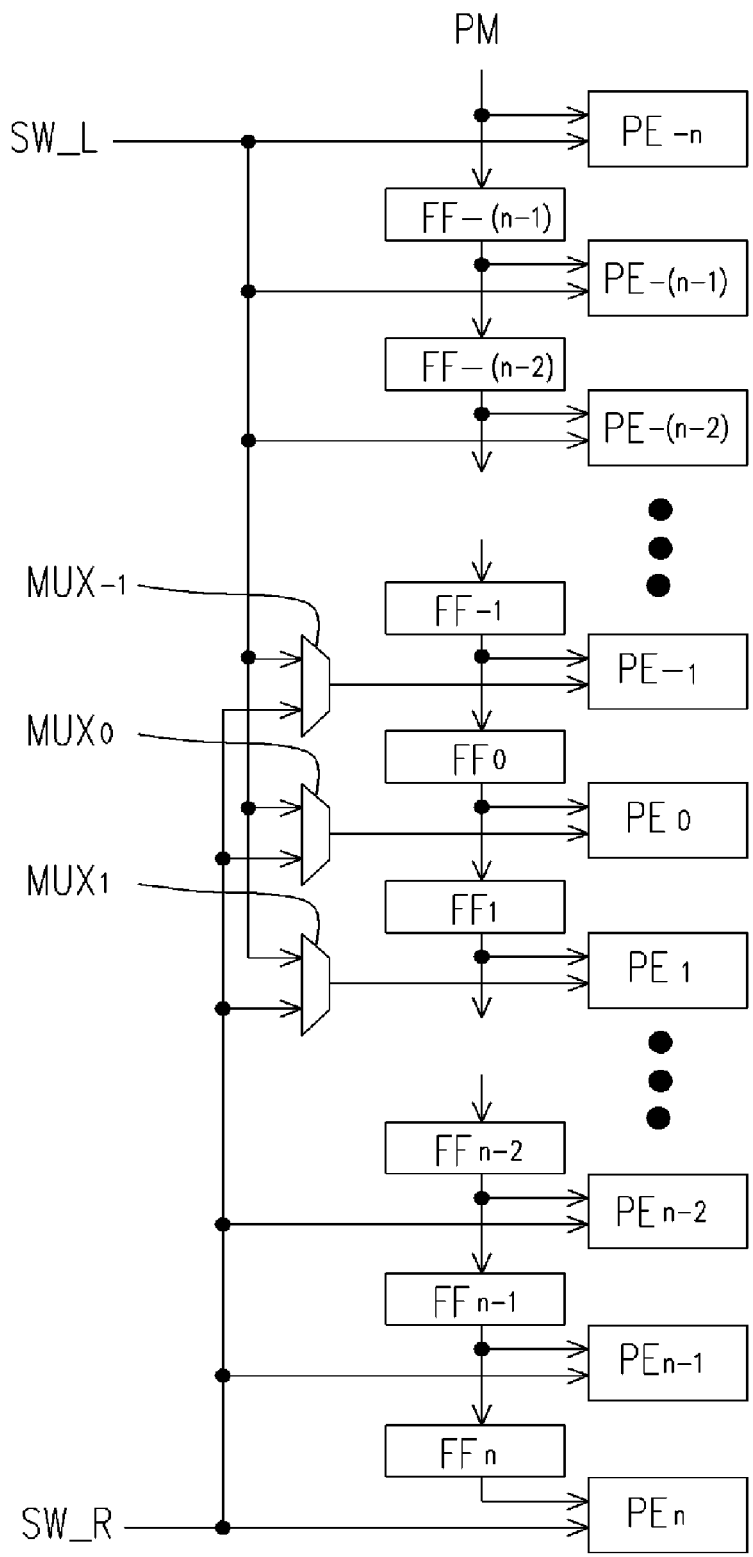
FIG. 2 is a schematic drawing of a motion estimation circuit having systolic array architecture according to an embodiment of the present invention.

FIG. 2 is a schematic drawing of a motion estimation circuit having systolic array architecture according to an embodiment of the present invention. Referring to FIGS. 1 and 2, the motion estimation circuit includes processing elements $PE_{-n}$~$PE_n$, data latches (for example, D-type flip-flops) $FF_{-(n-1)} \sim FF_n$ and selection circuits (for example, multiplexers) $MUX_{-1} \sim MUX_1$. Wherein, n denotes a search range value corresponding to the current block in the search window and is an integer larger than 0.

Each processing element $PE_{-n} \sim PE_n$ receives the pixel element data in the current block (hereinafter "PM") and the pixel element data of the corresponded block in the search window SW, performs a sum of absolute difference (SAD) computation on the pixel element data in the both blocks and outputs the result of the computation.

Figure 7:
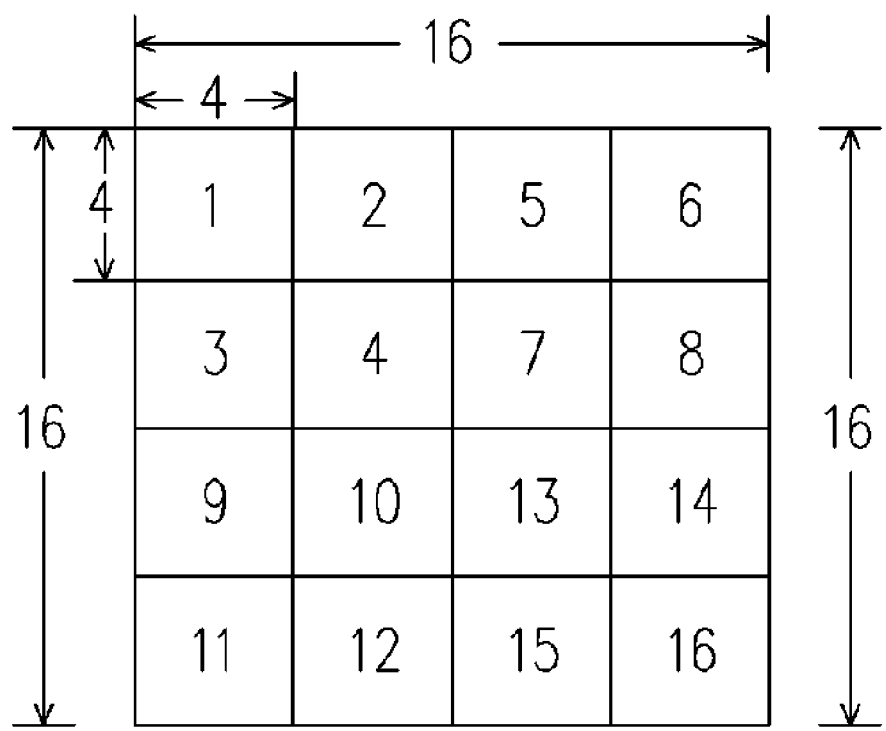
FIG. 7 is a schematic diagram showing a sequence arrangement of 4×4-pixel sub blocks in a 16×16-pixel block according to an embodiment of the present invention.

For convenience, it is assumed the current image block PM in FIG. 1 of the embodiment is a 16×16-pixel block. The 16×16-pixel block PM in FIG. 1 is virtually divided into a plurality of 4×4-pixel blocks in the sequence shown in FIG. 7 (i.e. the first sequence) for motion estimation performed by the motion estimation circuit in FIG. 2. Each square in FIG. 7 represents a 4×4-pixel block and the number in each square represents a sequence, by which each 4×4-pixel block in the 16×16-pixel PM is, from the mark PM in FIG. 2 in one-by-one manner, input into the motion estimation circuit.

According to a trigger of the clock signal, the data latches $FF_{-(n-1)} \sim FF_n$ latch the data at the input ends and output the data from the output ends. The output end of the data latch $FF_k$ is coupled to the input end of the data latch $FF_{k+1}$ and the first input end of the processing element $PE_k$. For example, the output end of the data latch $FF_0$ is coupled to the input end of the data latch $FF_1$ and the first input end of the processing element $PE_1$. Certainly, the input end of the data latch $FF_0$ is coupled to the output end of the data latch $FF_{-1}$ and the first input end of the processing element $PE_{-1}$. An unique point is that the last data latch $FF_n$ in the series-connected latch chain is only coupled to the first input end of the processing element $PE_n$ since there is no successive data latch available.

The selection circuits $MUX_{-1} \sim MUX_1$ select whether the first input end or the second input end is to couple to the output end thereof. The output end of the selection circuit $MUX_h$ is coupled to the second input end of the processing element $PE_h$. For example, the output end of the selection circuit $MUX_0$ is coupled to the second input end of the processing element $PE_0$.

In the current image block PM, the pixel element data $PMi_{,j}$ is input into the first input end of the processing element $PE_{-n}$ and the input end of the data latch $FF_{-(n-1)}$. The pixel element data $SW'_{x,a}$ in the left sector $(SW'\_L)$ of the sub search window SW' is input into the second input ends of the processing element $PE_{-n} \sim PE_{-2}$ and the first input ends of the selection circuits $MUX_{-1} \sim MUX_1$, wherein a is an integer larger than or equal to j-n but less than or equal to 1. The pixel element data $SW'_{x,b}$ in the right sector $(SW'\_R)$ of the sub search window SW' is input into the second input ends of the processing element $PE_2 \sim PE_n$ and the second input ends of the selection circuits $MUX_{-1} \sim MUX_1$, wherein b is an integer larger than or equal to 2 but less than or equal to j+n.

Figure 3:
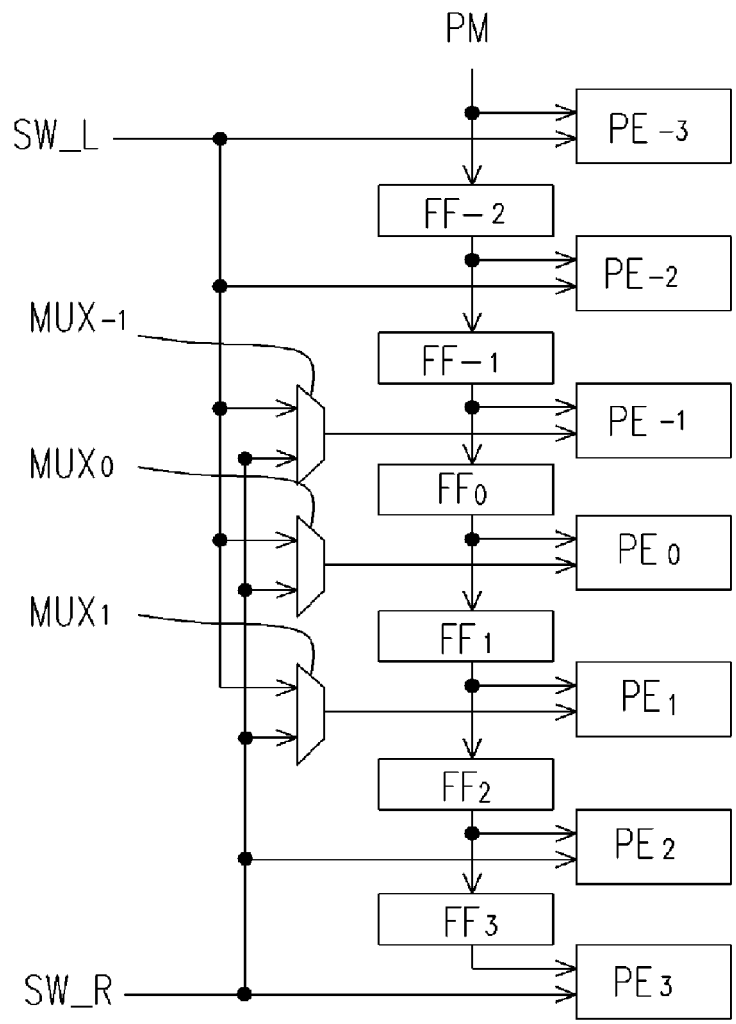
FIG. 3 is a schematic drawing of a motion estimation circuit having systolic array architecture and a search range value "3" according to another embodiment of the present invention.
Figure 4A:
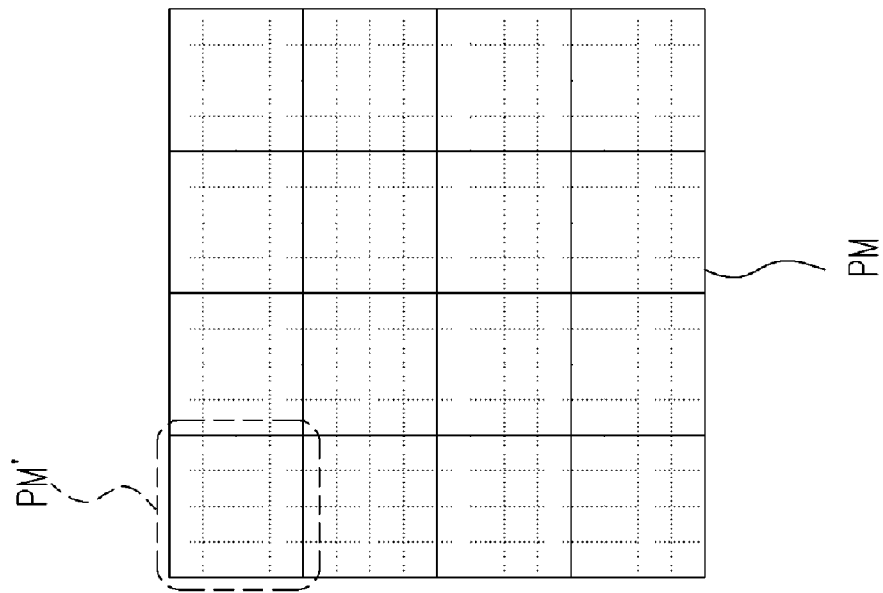
FIG. 4A is a schematic diagram showing a current image block and the corresponded search window with a search range value "3" according to another embodiment of the present invention.

To simplify the illustration, the following embodiment uses a search range value n=3 as an example. FIG. 3 is a schematic drawing of a motion estimation circuit having systolic array architecture and a search range value of 3 according to an embodiment of the present invention. FIG. 4A is a schematic diagram showing a current image block PM and the corresponded search window SW according to the embodiment of the present invention. Each squares in FIG. 4A represents a pixel data. As shown in FIG. 1, the current image block PM of FIG. 4A will be compared and determined whether there is a similar image block in the reference frame. In the reference frame, a same-sized block PS is taken as the center point at the same position as the position of the image block PM; from the block PS extending with a same distance at four sides is chosen to form a search window SW. As described above, the current image block PM is virtually divided into 16 pieces of 4×4-pixel sub blocks, and the sub blocks are in the sequence shown in FIG. 7 input into the motion estimation circuit 300 in FIG. 3. For simplicity, the first 4×4-pixel sub block PM' and the sub search window SW' in the search window SW are taken as an example, wherein the sub search window SW' is in a same position corresponding to the sub block PM'. The operations of the rest sub blocks can be referred to the example described hereinafter.

FIG. 4B is a schematic diagram showing a 4×4-pixel sub block PM' of the current image block PM in FIG. 4A and a corresponded sub search window SW' in the search window SW. Referring to FIGS. 3 and 4B, wherein FIG. 3 is a particular example of FIG. 2, therefore the description of the structure of the motion estimation circuit 300 in FIG. 3 is omitted. The 4×4-pixel sub block PM' and the corresponded sub search window SW' in FIG. 4B are in two different frames, respectively (referring to FIG. 1, too). In the reference frame, a same-sized block (a block with dashed line in FIG. 4B) at the same position as the position of the 4×4-pixel sub block PM' is taken as the center point, and from the center extending outwards with a same distance, i.e. the search range n, at four sides are chosen, which with the same-sized block together form a sub search window SW', wherein the search range n is 3 in the embodiment.

In the embodiment, the sub search window SW' is divided into a first sector of the sub search window at the left side, $SW'\_L$, and a second sector of the sub search window at the right side, $SW'\_R$. Every pixel element data in $SW'\_L$ and every pixel element data in $SW'\_R$ are input into the motion estimation circuit 300 via the left input end $SW\_L$ and the right input end $SW\_R$ in FIG. 3, respectively. Meanwhile, the pixel element data of the sub block PM' in FIG. 4B are input into the motion estimation circuit 300 via the input end PM of FIG. 3. All pixel element data, no matter in the left sector of the sub search window SW', the right sector of the sub search window SW' or the sub block PM' are sequentially input into the motion estimation circuit 300 in row-by-row and pixel-by-pixel manner. For example, the sub block PM' is input in this way that the pixel element data of row 0 are sequentially from left to right input into the motion estimation circuit 300, followed by inputting row 1, row 2 and row 3. In other words, the pixel element data of the sub block PM' in FIG. 4B are input in the sequence of $PM'_{0,0}$, $PM'_{0,1}$, $PM'_{0,2}$, $PM'_{0,3}$, $PM'_{1,0}$, $PM'_{1,1}$, ..., $PM'_{3,3}$.

Figure 4A:
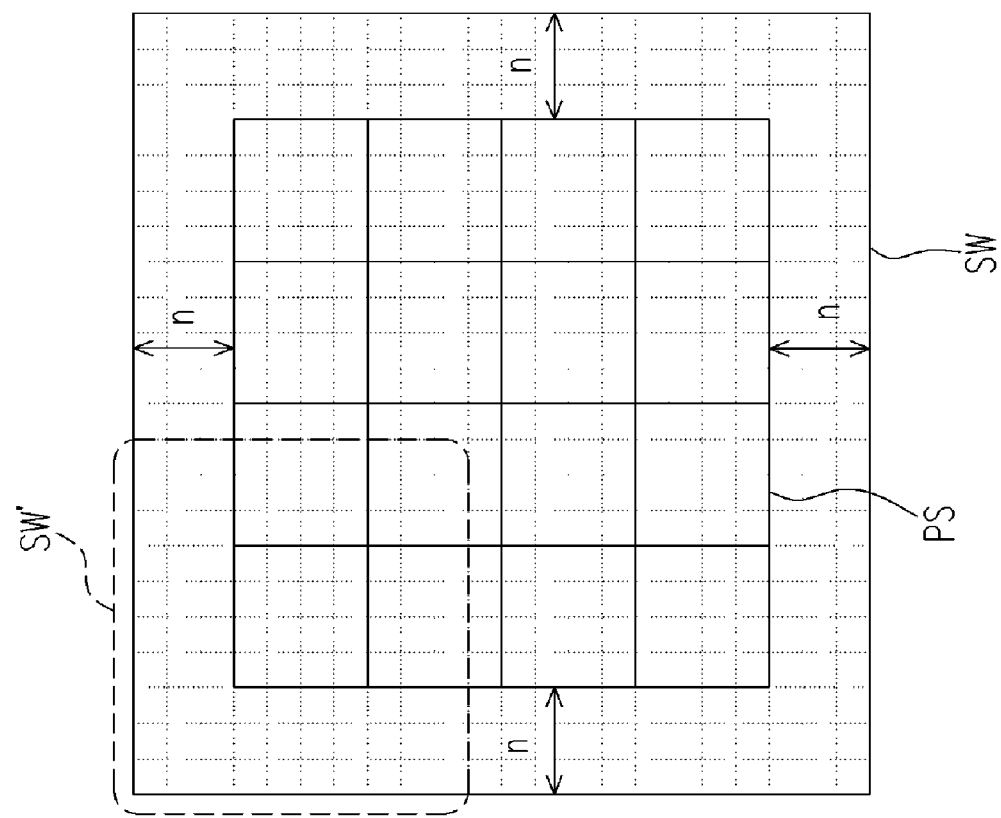
Figure 4B:
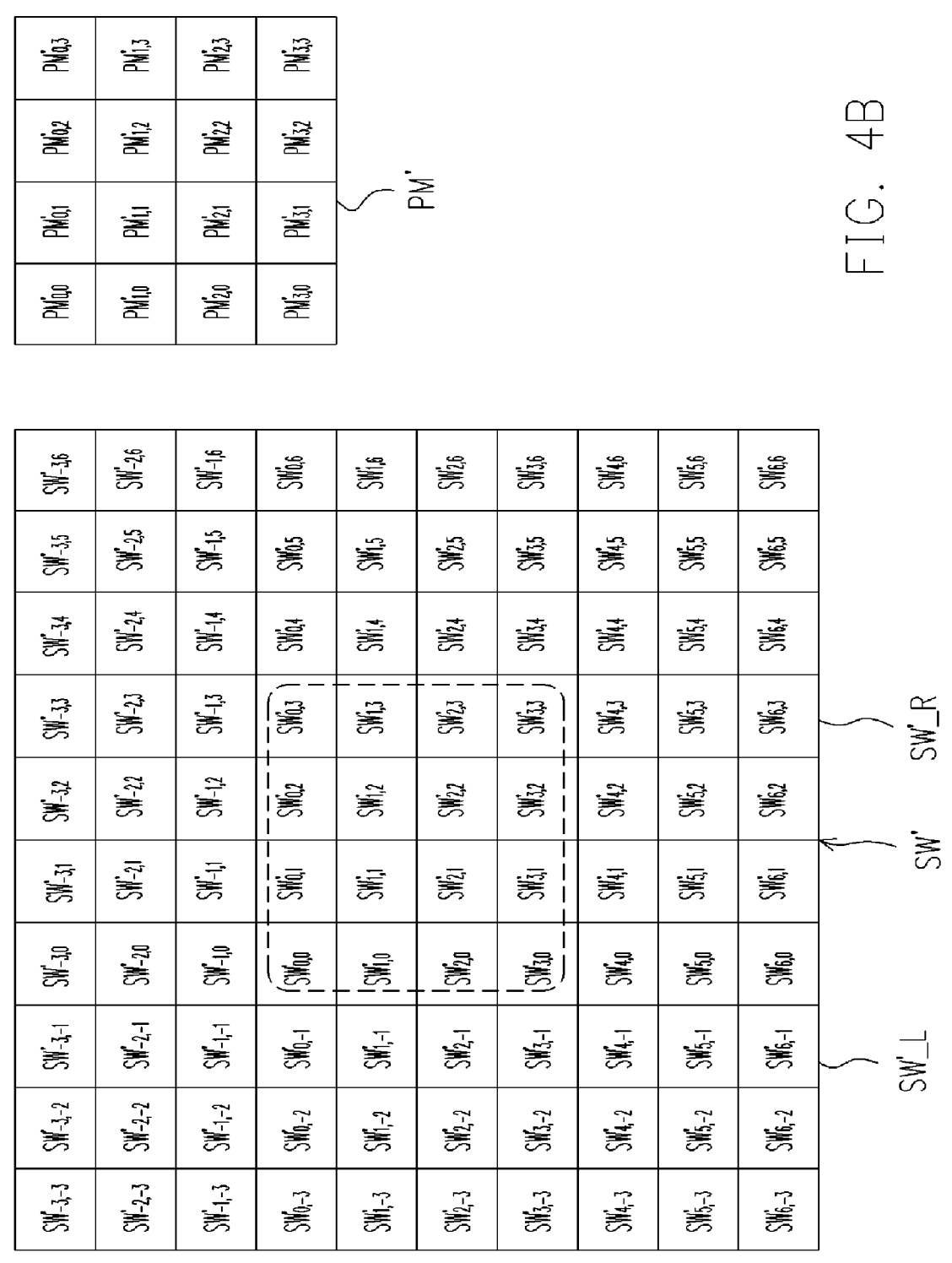
Figure 5:
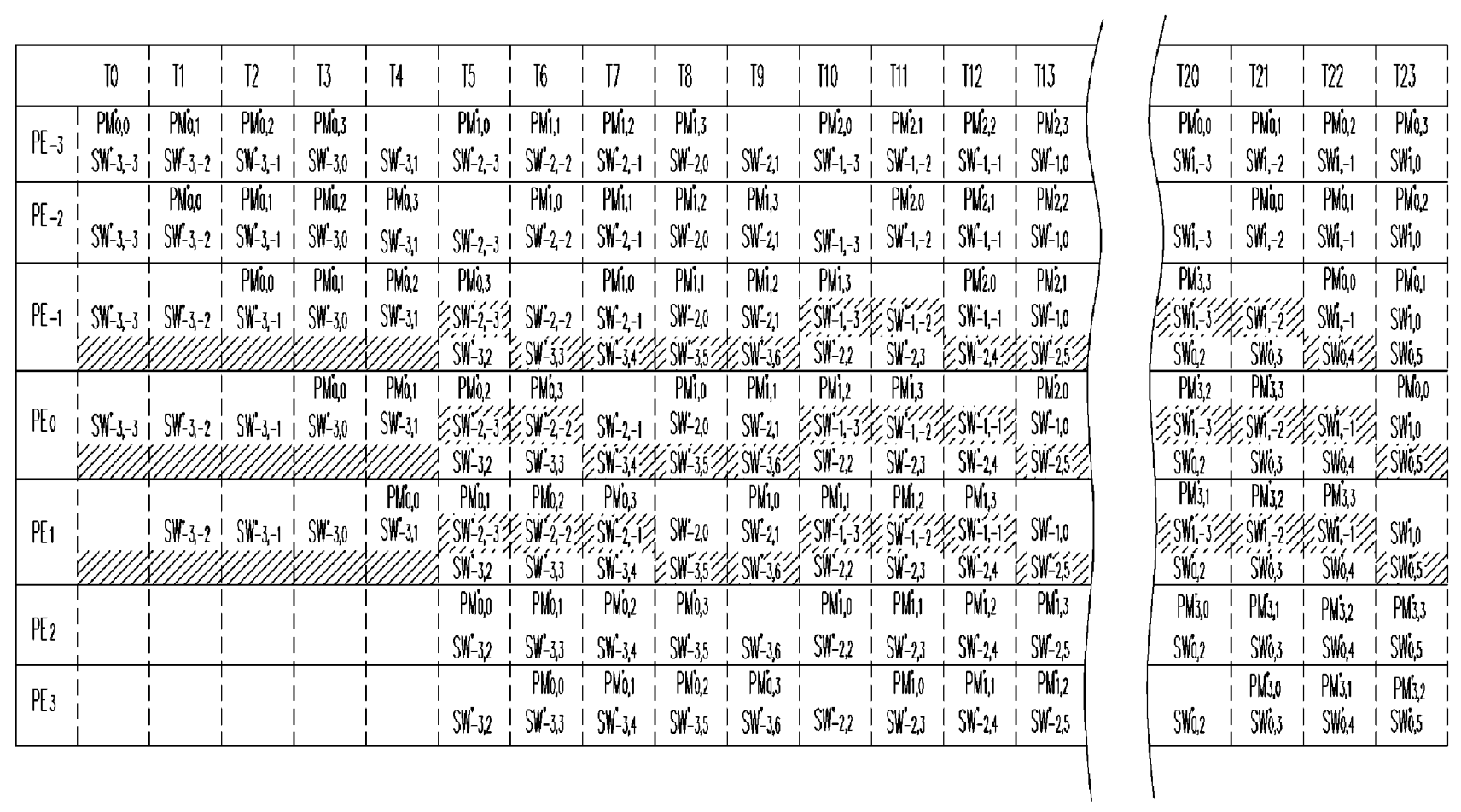

FIG. 5 is a schematic timing diagram for inputting data into the motion estimation circuit in FIG. 3 according to the embodiment of the present invention. Referring to FIG. 3~FIG. 5, in FIG. 5 the ordinate axis represents the received data at the first input end and the second input end of processing elements $PE_{-n} \sim PE_n$ (in the embodiment, $PE_{-3} \sim PE_3$) while the abscissa axis represents time points. Wherein, at the second input end of processing elements $PE_{-1} \sim PE_1$, the input data are either the left (first) sector of the sub search window $SW'\_L$ or the right (second) sector of the sub search window $SW'\_R$ switched by the selection circuit MUX-1~MUX1. In FIG. 5, some areas shadowed with hatching lines denote the data which are not selected.

The data latches in series connection $FF_{-(n-1)} \sim FF_n$ (in the embodiment, they are D-type flip-flops $FF_{-2} \sim FF_3$) are operated similarly as shift registers. Therefore, there must be one clock cycle of timing delay for two consecutive processing elements to receive the pixel data of the current image sub block PM', which can be seen from the current image sub block PM' received by the processing elements $PE_{-3} \sim PE_3$ FIG. 5. In more detail, at time point To the current image sub block PM' and the left sector of the sub search window SW'_L are sequentially input into the motion estimation circuit 300 in the above-described sequence. Since at time point T3 the first row data of the current image sub block PM' have been input completely, inputting the second row data of the current image block PM must wait for n−2 clock cycles to start. In the embodiment, a waiting of n−2 clock cycles means a waiting of 1 clock cycle, therefore at time point T5, i.e. passing time point T4, inputting the second row data of the current image block PM is started.

At time point T5, i.e. in a delay of n+2 clock cycles after starting to input the data of the left sector of the sub search window SW'_L, inputting the data of the right (second) sector of the sub search window SW'_R is begun and the pixel data are input into the motion estimation circuit 300 in the same way, row-by-row and pixel-by-pixel. In the embodiment, at time point T5, for example, the data of the right sector of the sub search window SW'_R are input into the processing elements $PE_{-1} \sim PE_1$ according to the selection circuits $MUX_{-1} \sim MUX_1$, respectively. At time point T6, the data of the right sector of the sub search window SW'_R are input into the processing elements $PE_0$ and $PE_1$ according to the selection circuits $MUX_0 \sim MUX_1$, respectively. At time point T7, the data of the right sector of the sub search window SW'_R are input into the processing element $PE_1$ according to the selection circuit $MUX_1$. During the rest time, i.e. except for time points T5, T6 and T7, the data of the left sector of the sub search window SW'_L are input into the processing elements $PE_{-1} \sim PE_1$ according to the selection circuit $MUX_{-1} \sim MUX_1$. The above-described selection circuits $MUX_{-1} \sim MUX_1$ are switched repeatedly, for example, every n+2 clock cycles (in the embodiment, every 5 clock cycles).

It can be seen from the timings of T0~T13 in FIG. 5 that the processing element $PE_{-3}$ computes the sum of absolute difference (SAD) on the partial sub block data in the sub search window $SW_{p,q}$ and the data of the current sub block PM', where $-3 \leq p, q \leq 0$ and p and q are integers. The processing element $PE_{-2}$ computes the SAD on the partial sub block data in the sub search window $SW_{p,q}$ and the data of the current sub block PM', where $-3 \leq p \leq 0$, $-2 \leq q \leq 1$ and p and q are integers. The processing element $PE_3$ computes the SAD on the partial sub block data in the sub search window $SW_{p,q}$ and the data of the current sub block PM', where $-3 \leq p \leq 0$, $3 \leq q \leq 6$ and p and q are integers. Analogically, after inputting the whole current image sub block PM', i.e. at time point T20, the current image sub block PM' and the second row of the left sector of the sub search window SW'_L are again begun inputting into the motion estimation circuit 300. Starting from time point T20, the processing element $PE_{-3}$ compares the partial sub block data in the sub search window $SW_{p,q}$ and the data of the current sub block PM', where $-2 \leq p \leq 1$, $-3 \leq q \leq 0$ and p and q are integers; the processing element $PE_{-2}$ compares the partial sub block data in the sub search window $SW_{p,q}$ and the data of the current sub block PM', where $-2 \leq p \leq 1$, $-2 \leq q \leq 1$ and p and q are integers; the processing element $PE_3$ compares the partial sub block data in the sub search window $SW_{p,q}$ and the data of the current sub block PM', where $-2 \leq p \leq 1$, $3 \leq q \leq 6$ and p and q are integers. The similar steps are performed until the data of the whole sub search window SW' are input into the motion estimation circuit 300.

Figure 6:
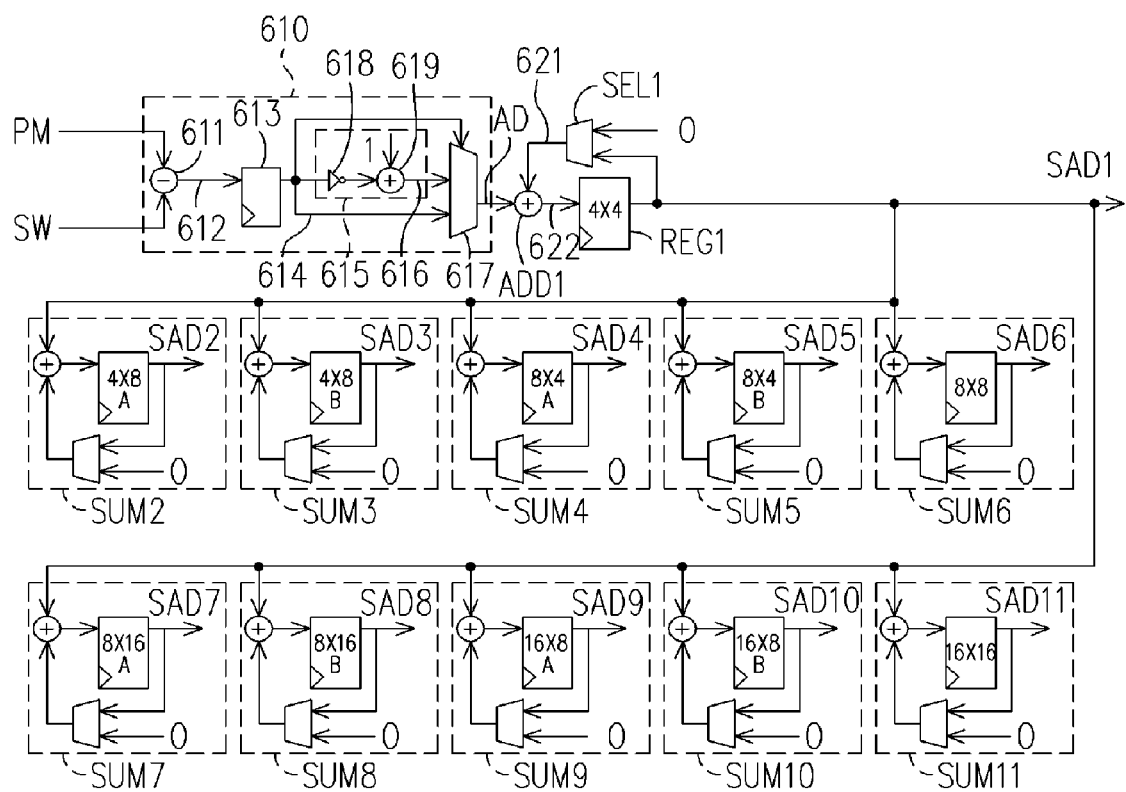
FIG. 6 is a circuit block diagram of the processing elements $PE_{-n}$~$PE_n$ in FIG. 2 and FIG. 3 according to an embodiment of the present invention.

The operations of the above-described processing elements $PE_{-n} \sim PE_n$ can be explained with the following embodiment. FIG. 6 is a circuit block diagram of the processing elements $PE_{-n} \sim PE_n$ in FIG. 2 and FIG. 3 according to an embodiment of the present invention. Referring to FIG. 6, it is assumed that all processing elements are SAD circuits used for SAD computations on pixel data over pixel data. In the processing elements, an absolute difference (AD) circuit 610 receives the pixel data series of the current image block PM and the pixel data series of the partial blocks in the search window SW and outputs the absolute difference data AD, wherein AD=|PM−SW|.

The operation of the above-described AD circuit 610 can be practiced with the present embodiment. First, a subtractor 611 receives the pixel data of the current image block PM and the pixel data of the partial block in the search window SW and outputs a difference value 612 after subtracting the two pixel data. Next, a register 613 coupled to the subtractor 611 latches the difference value 612 and outputs a difference value 614. Further, a complement circuit 615 coupled to the register 613 generates a complement value 616 of the difference values according to the difference value 614. Finally, a selection circuit 617 coupled to the register 613 and the complement circuit 615 selects and outputs a positive number value between the received difference value 614 and the received complement 616 of the difference value as the absolute difference data AD.

The above-mentioned complement circuit includes, for example, an inverter 618 and an adder 619. The inverter 618 receives and inverts the difference value 614. The adder 619 coupled to the inverter 618 receives the inverted difference value 614, adds "1" with the inverted difference value 614 and outputs the complement value 616 of the inverted difference value 614.

The adder ADD1 receives and adds the absolute difference data AD with an accumulation data 621, and outputs the summed result as a sum value 622. Another register REG1 receives and latches the sum value 622 according to a predetermined timing and then outputs the data of sum of absolute difference SAD1. A selection circuit SEL1 receives and selects either the data of SAD1 or "0" and outputs the selected data as the accumulation data 621.

As the first absolute difference data AD is generated, the selection circuit SEL1 selects "0" to send to the adder ADD1 and the register REG1 is demanded to latch the computation result of AD+0 output from the adder ADD1. At this time, the register REG1 is able to register the SAD computation result without using reset function. In other words, no matter what the register REG1 latches previously, once the selection circuit SEL1 selects "0" and sends it to the adder ADD1, the register REG1 would properly latch the first absolute difference data AD without clearing the content in the register prior to latching. In this way, the processing time to reset the register REG1 is saved, yet the reset function is achieved.

At this point, it is assumed that the register REG1 is used for registering the SAD value of 4×4 pixels in the current image block PM. As the first absolute difference data $AD_{i,j}$ is generated, the selection circuit SEL1 selects "0" and sends "0" to the adder ADD1 and the register REG1 is demanded to latch the computation result of $AD_{i,j}$+0 output from the adder ADD1. As the second absolute difference data $AD_{i,j+1}$ is generated, the selection circuit SEL1 selects the data SAD1 output from the register REG1 (i.e. $AD_{i,j}$) and sends it to the adder ADD1. Then, the register REG1 is demanded to latch the computation result of $AD_{i,j}$+$AD_{i,j+1}$ output from the adder ADD1. Analogically, as the absolute difference circuit 610 generates the last absolute difference data $AD_{i+3,j+3}$ of the 4×4 pixels, the register REG1 is demanded to select the data SAD1 (i.e. $AD_{i,j}$+ . . . +$AD_{i+3,j+2}$) outut from the register REG1 and sends it to the adder ADD1. After that, the register REG1 is demanded to latch the computation result of $AD_{i,j}+\ldots+AD_{i+3,j+2}+AD_{i+3,j+3}$ output from the adder ADD1. A SAD computation for a whole 4×4 pixel is completed hereto.

Nevertheless, the present invention is able to provide motion estimations for image blocks with various sizes, and is not limited to the 4×4-pixel size of the above-described embodiment. According to the present embodiment, a plurality of accumulation circuits SUM2~SUM11 is coupled to the output end of the register REG1 used for receiving computed SAD values of 4×4 pixels (i.e. the data of sum of absolute difference SAD1). The plurality of accumulation circuits SUM2~SUM11 are used to accumulate the received data of sum of absolute difference SAD1 respectively and then output the accumulated data of sum of absolute difference respectively for the certain-sized image blocks to be computed. For example, the accumulation circuits SUM2~SUM11 accumulate the data of sum of absolute difference SAD2~SAD11 corresponding to various blocks with 4×8 pixels (left), 4×8 pixels (right), 8×4 pixels (upper), 8×4 pixels (lower), 8×8 pixels, 8×16 pixels (left), 8×16 pixels (right), 16×8 pixels (upper), 16×8 pixels (lower) and 16×16 pixels, respectively. According to a predetermined timing, the accumulations are repetitively performed.

To those skilled in the art, it should be known that the number of the accumulation circuits in the present embodiment depends on the real need. For example, if only 4×4-pixel, 8×8-pixel and 16×16-pixel blocks need to be computed for the data of sum of absolute difference thereof, the accumulation circuits SUM2~SUM5 and SUM7~SUM10 in FIG. 6 can be saved. Any such modifications are still without departing from the scope or spirit of the invention.

In the embodiment, the accumulation circuits SUM2~SUM11 are similar to each other; therefore, only the accumulation circuit SUM11 is used as an example for detailed description. The accumulation circuit SUM11 includes, for example, an adder, a register and a selection circuit, which are operated similarly to the adder ADD1, register REG1 and selection circuit SEL1, respectively. For simplicity, the description is omitted. Wherein, the sequence for the accumulation circuit SUM11 to receive the data of sum of absolute difference SAD1 (i.e. computation result of 4×4-pixel block SAD) is shown in FIG. 7.

FIG. 7 is a schematic diagram showing a sequence arrangement of 4×4-pixel sub blocks in a 16×6-pixel block according to an embodiment of the present invention. Each square box in the figure represents a data of sum of absolute difference of a 4×4-pixel block, which is, for example, obtained by computing the output from the absolute difference circuit (AD circuit) 610 in FIG. 6. The numeral figures in the square boxes represent the sequence to generate the data. Therefore, the accumulation circuit SUM6, for example, block-by-block receives and accumulates the data of sum of absolute difference (SAD) of No. 1~No. 4 4×4-pixel blocks and in this way the SAD of No. 1 8×8-pixel block is obtained. Further, the above-described process continues; SUM6 block-by-block receives and accumulates the data of SAD of No. 5~No. 8 4×4-pixel blocks to obtain the SAD of No. 2 8×8-pixel block; SUM6 block-by-block receives and accumulates the data of SAD of No. 13~No. 16 4×4-pixel blocks, the SAD of No. 4 8×8-pixel block is obtained. Meanwhile, the accumulation circuit SUM11 also block-by-block receives and accumulates the data of SAD of No. 1~No. 16 4×4-pixel blocks to obtain the SAD of a 16×16-pixel block.

In the above-described embodiment, a plurality of data of sum of absolute difference (SAD) for various-sized image blocks can be simultaneously provided within the shortest time. In the following embodiment, however, the processing elements are designed according to another criterion that the area for circuitry layout is restricted.

Figure 8:
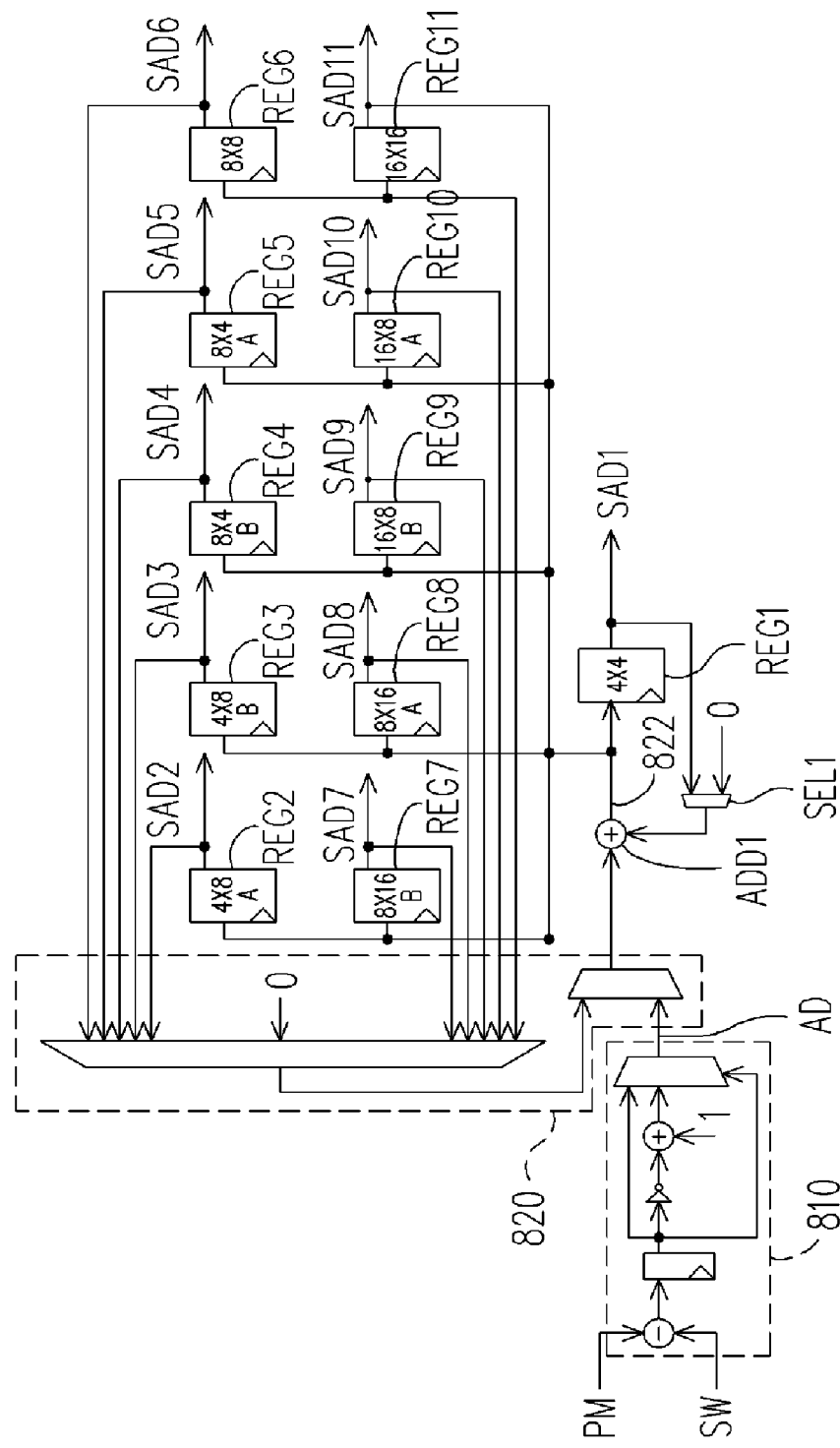
FIG. 8 is another circuit block diagram of the processing elements $PE_{-n}$~$PE_n$ in FIG. 2 and FIG. 3 according to an embodiment of the present invention.

FIG. 8 is another circuit block diagram of the processing elements $PE_{-n}$~$PE_n$ in FIG. 2 and FIG. 3 according to the embodiment of the present invention. Referring to FIG. 8, an absolute difference circuit 810 receives the pixel data series of the current image block PM and the pixel data series of the partial blocks in the search window SW and outputs the absolute difference data AD. Wherein, the absolute difference circuit 810, an adder ADD1, a register REG1 and a selection circuit SEL1 are the same as, for example, the absolute difference circuit 610, the adder ADD1, the register REG1 and the selection circuit SEL1 in FIG. 6. For simplicity, the description is omitted.

Referring to FIG. 8, the selection circuit 820 is coupled between the absolute difference circuit 810 and the adder ADD1. At the point, the register REG1 is assumed for registering SAD values of 4×4 pixels. In fact, the present invention is able to provide SAD values for a plurality of various-sized image blocks simultaneously, and is not limited to the 4×4-pixel size. According to the present embodiment, a plurality of registers REG2~REG11 is coupled to the output end of the adder ADD1 used for receiving computed SAD values of 4×4 pixels (i.e. the data of sum of absolute difference SAD1). The plurality of registers REG2~REG11 are used to accumulate the received data of sum of absolute difference SAD1 respectively and then output the accumulated data of sum of absolute difference respectively for the certain-sized image blocks to be computed. For example, the registers REG2~REG11 accumulate the data of sum of absolute difference SAD2~SAD11 corresponding to various blocks with 4×8 pixels (left), 4×8 pixels (right), 8×4 pixels (upper), 8×4 pixels (lower), 8×8 pixels, 8×16 pixels (left), 8×16 pixels (right), 16×8 pixels (upper), 16×8 pixels (lower) and 16×8 pixels, respectively. According to a predetermined timing, the accumulations are repetitively performed.

To those skilled in the art, it should be known that the number of the accumulation circuits in the present embodiment depends on the real need. For example, if only 4×4-pixel, 8×8-pixel and 16×16-pixel blocks need to be computed for the data of sum of absolute difference thereof, the registers REG2~REG5 and REG7~REG10 in FIG. 8 can be saved. Any such modifications are still without departing from the scope or spirit of the invention.

The sequence of the series arrangement of 4×4-pixel blocks in the embodiment is shown in FIG. 7. Referring to FIG. 7 and FIG. 8, if the adder ADD1 has completed the SAD computation of No. 1 4×4-pixel image block (at this time, the sum value 822 is the data of sum of absolute difference of the whole 4×4-pixel image block), the registers REG2, REG4, REG6, REG7, REG9, REG11 and REG1 are demanded to latch the sum value 822. After that, the selection circuit 820 is demanded to one-by-one select the data SAD4, SAD6, SAD7, SAD9 and SAD11, to output the data to the adder ADD1 for the computations of adding the data of sum of absolute difference (SAD1) of No. 2 4×4-pixel image block respectively and to store the accumulation results, respectively. At this point, the register REG4 outputs the data of SAD4 of No. 1 8×4-pixel image block. The rest procedure can be deduced from the description described above and the details are omitted.

Each of the SAD circuits in FIG. 6 and FIG. 8 has its particular advantage. For example, the SAD circuit in FIG. 6 is able to provide a plurality of SADs of various-sized image blocks within a shortest time. The SAD circuit in FIG. 8 is able to provide a circuit with a minimum area. A further embodiment is described hereafter, which has a compromised performance of circuitry area and computation function between the SAD circuit in FIG. 6 and that in FIG. 8.

Figure 9:
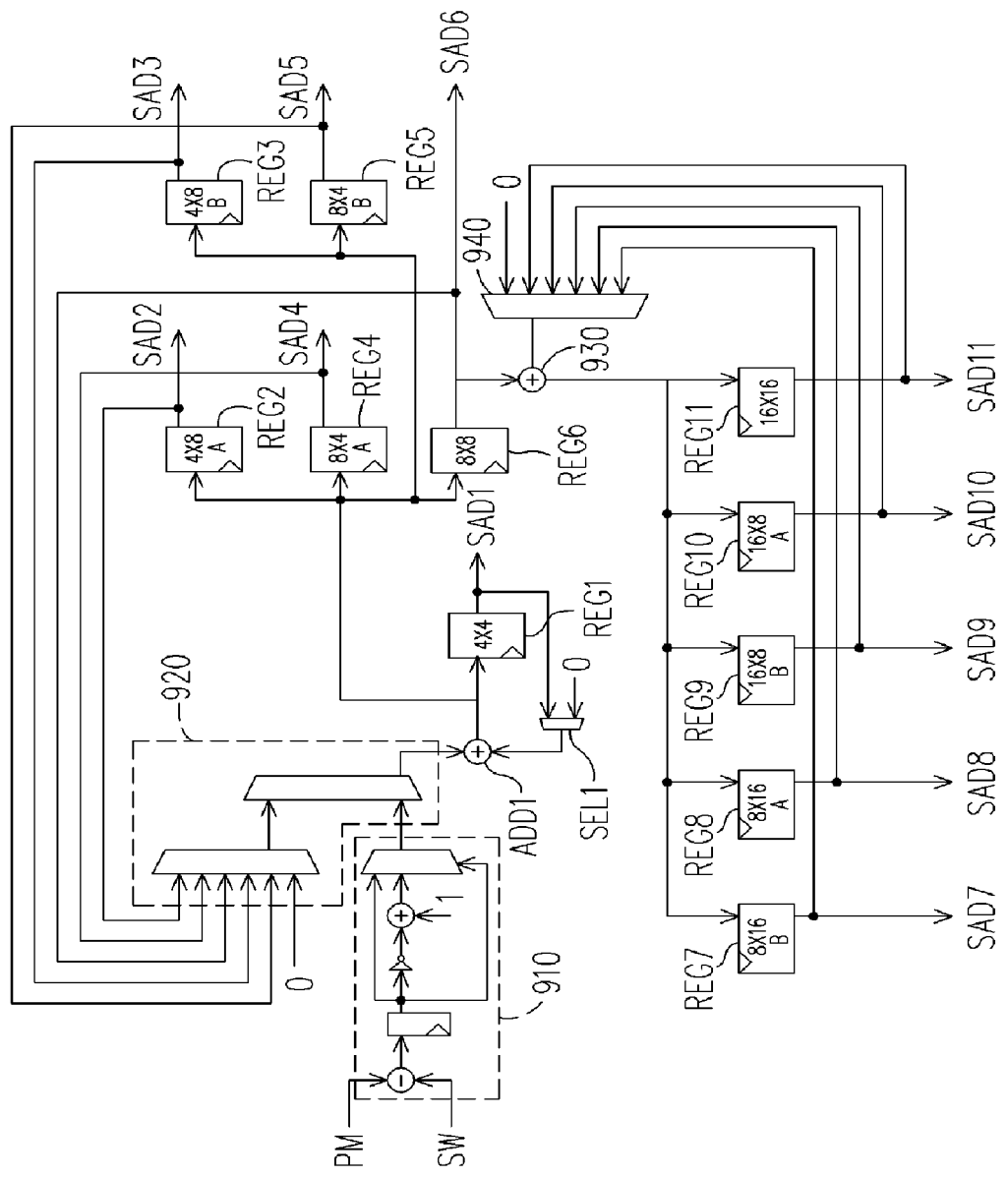
FIG. 9 is a further circuit block diagram of the processing elements $PE_{-n}$~$PE_n$ in FIG. 2 and FIG. 3 according to an embodiment of the present invention.

FIG. 9 is a further circuit block diagram of the processing elements $PE_{-n}$~$PE_n$ in FIG. 2 and FIG. 3 according to the embodiment of the present invention. Referring to FIG. 9, an absolute difference circuit 910 receives the pixel data series of the current image block PM and the pixel data series of the partial blocks in the search window SW and outputs the absolute difference data AD. Wherein, the absolute difference circuit 910, an adder ADD1, registers REG1~REG6 and selection circuits SEL1 and 920 are the same as, for example, the absolute difference circuit 810, the adder ADD1, the registers REG1~REG6 and the selection circuit SEL1 and 820 in FIG. 8. Thus, the description is omitted.

Referring to FIG. 9, the adder 930 coupled to the output end of the register REG6 receives the data of SAD6, which is then added to the data output from the selection circuit 940. During a time gap that after a SAD computation for a 8×8-pixel image block is completed (i.e. an SAD data of a 8×8-pixel image block is latched in the register REG6) but prior to outputting the SAD data of a whole 4×4-pixel image block by the adder ADD1, the data SAD6 is accumulated to a corresponding register by switching the selection circuit 940. In comparison with FIG. 8, the SAD circuit of the present embodiment is more efficient, although the embodiment adds an additional selection circuit 940 and an adder 930.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A motion estimation circuit, for searching a block in a search window is most similar to a current block, wherein the current block comprises at least a 4×4-pixel sub block, the motion estimation circuit comprising:

a plurality of processing elements $PE_m$, wherein each processing element has at least a first input end, at least a second input end and at least an output end and is used for receiving the current block and the corresponded block in the search window, doing a comparison operation between the two received blocks and outputting the comparison operation result, where $PE_m$ represents m-th processing element, m is an integer larger than or equal to −n but less than or equal to n, n represents a search range value of the current block in the search window and is an integer larger than 0;

a plurality of data latches $FF_k$ having an input end and an output end, wherein the $FF_k$ output end is coupled to the $FF_{k+1}$ input end and the first input end of $PE_k$, where $FF_k$ represents k-th data latch, k is an integer larger than −n but less than or equal to n; and a plurality of selection circuits $MUX_h$ having a first input end, a second input end and an output end, used for selecting either the first input end of $MUX_h$ or the second input end of $MUX_h$ to be coupled to the output end of $MUX_h$, wherein the output end of $MUX_h$ is coupled to the second input end of $PE_h$, where $MUX_h$ represents h-th selection circuit and h is an integer larger than or equal to −i but less than or equal to i, wherein i is an integer less than n;

wherein the 4×4-pixel sub blocks of the current block are pixel-by-pixel input into the first input end of $PE_{-n}$ and the input end of $FF_{-(n-1)}$ according to a first sequence, the data of partial pixel elements in the search window are input into the second input end of $PE_r$ and the first input end of $MUX_h$ according to a second sequence, where r is an integer larger than or equal to −n but less than −i, and the data of rest partial pixel elements in the search window are input into the second input end of $PE_s$ and the second input end of $MUX_h$ according to a third sequence, where s is an integer larger than i but less or equal to n.

2. The motion estimation circuit as recited in claim 1, wherein each of the processing elements is a sum of absolute difference (SAD) circuit and the comparison operation is a sum of absolute difference (SAD) computation.

3. The motion estimation circuit as recited in claim 2, wherein the SAD circuit comprises:

an absolute difference (AD) circuit, used for receiving the current block and partial blocks in the search window and outputting a absolute difference (AD) data;

a first adder, used for receiving and summing the AD data and a first accumulation data and outputting the summed result as a first sum value;

a first register, used for receiving the first sum value according to a first predetermined timing, latching the first sum value and then outputting a first SAD data; and a first selection circuit, used for receiving and selecting either the first SAD data or a zero data and outputting the selected data as the first accumulation data, wherein the value of the zero data is binary number 0.

4. The motion estimation circuit as recited in claim 3, wherein the AD circuit comprises:

a subtractor, used for receiving the pixel element data in the current block and the pixel element data in the partial blocks in the search window, doing subtractions on the corresponded pixel element data in the current block and the partial blocks and outputting a plurality of difference values;

a second register, coupled to the subtractor and used for one-by-one latching the difference values according to a second predetermined timing;

a complement circuit, coupled to the second register and used for generating a complement value of the difference values latched by the second register; and a second selection circuit, coupled to the second register and the complement circuit and used for selecting the positive value from either the received difference value or the complement value of the difference value and outputting the selected positive value as the AD data.

5. The motion estimation circuit as recited in claim 4, wherein the complement circuit comprises:

an inverter, used for receiving and inverting the difference value latched by the second latch and outputting an inverted difference value; and a second adder, coupled to the inverter and used for receiving and summing the inverted difference value and a "1" data and outputting the complement value of the difference value, wherein the "1" data is binary number 1.

6. The motion estimation circuit as recited in claim 3, wherein the first register in the SAD circuit has no reset function.

7. The motion estimation circuit as recited in claim 3, wherein the SAD circuit further comprises at least an accumulation circuit used for receiving and accumulating the first SAD data, then outputting a second SAD data and doing accumulation again and again according to the predetermined timing.

8. The motion estimation circuit as recited in claim 7, wherein the accumulation circuit comprises:
- a third adder, used for receiving and summing the first SAD data and a third accumulation data and then outputting a summed result as a third sum value;
- a third register, used for receiving and latching the third sum value according to a third predetermined timing and then outputting the second SAD data; and
- a third selection circuit, used for receiving the second SAD data and the zero data, selecting one of the second SAD data and the zero data and outputting the selected data as the third accumulation data.

9. The motion estimation circuit as recited in claim 8, wherein the SAD circuit further comprises:
- a fourth adder, used for receiving and summing the second SAD data and a fourth accumulation data and outputting the summed result as a fourth sum value;
- a fourth register, used for receiving and latching the fourth sum value according to a fourth predetermined timing and then outputting a third SAD data; and
- a fourth selection circuit, used for receiving and selecting either the third SAD data or the zero data and outputting the selected data as the fourth accumulation data.

10. The motion estimation circuit as recited in claim 3, wherein the SAD circuit further comprises:
- a fourth register, used for receiving and latching the first sum value according to a fourth predetermined timing for outputting a third SAD data; and
- a fourth selection circuit, coupled between the AD circuit and the first adder, connected to the fourth register, used for receiving and selecting one of the AD data, the third SAD data and the zero data and sending the selected data to the first adder for adding computation with the first accumulation data.

11. The motion estimation circuit as recited in claim 10, wherein the SAD circuit further comprises:
- a fifth adder, used for receiving and summing the third SAD data and a fifth accumulation data and outputting the summed result as a fifth sum value;
- a fifth register, used for receiving and latching the fifth sum value according to a fifth predetermined timing and then outputting a fourth SAD data; and
- a fifth selection circuit, used for receiving and selecting one of the fourth SAD data and the zero data and then outputting the selected data as the fifth accumulation data.

12. The motion estimation circuit as recited in claim 1, wherein the data latches are flip-flops.

13. The motion estimation circuit as recited in claim 12, wherein the flip-flops are D-type flip-flops.

14. The motion estimation circuit as recited in claim 1, wherein the selection circuits are multiplexers.

15. The motion estimation circuit as recited in claim 1, used for a video processing, wherein the current block is a partial block in a current frame to be matched in the video processing, and the search window locates in a previous frame and includes a same-sized partial block as the current block with a position corresponding to the position of the current block in the current frame.

16. An operating method of motion estimation circuits, used for searching a block in a search window (SW) most similar to a current block, wherein the current block comprises at least a 4×4-pixel sub block and the motion estimation circuit comprises a plurality of processing elements $PE_m$, a plurality of data latches $FF_k$ and a plurality of selection circuits $MUX_h$, where $PE_m$ represents m-th processing element, $FF_k$ represents k-th data latch, $MUX_h$ represents h-th selection circuit, m is an integer larger than or equal to −n but less than or equal to n, n represents a search range value of the current block in the search window and is an integer larger than 0, k is an integer larger than −n but less than or equal to n and h is an integer larger than or equal to −i but less than or equal to i, further the output end of $FF_k$ is coupled to the input end of $FF_{k+1}$ and the first input end of $PE_k$, and the output end of $MUX_h$ is coupled to the second input end of $PE_h$, moreover, the operating method comprises the following steps:
- selecting one of the 4×4-pixel sub blocks in the current block according to a first sequence;
- defining a sub search window (SSW) at the position corresponding to the selected 4×4-pixel sub block and with the search range value in the search window (SW), wherein the sub search window (SSW) comprises a first sector of the SSW and a second sector of the SSW;
- according to a clock signal timing, inputting every pixel element data of the selected 4×4-pixel sub block, row-by-row and pixel-by-pixel, into the first input end of $PE_{-n}$ and the input end of $FF_{-(n-1)}$, and starting to input the next row pixel element data after completing to input the current row pixel element data in the selected 4×4 sub block plus a waiting time of (n−2) clock cycles;
- according to the clock signal timing, as inputting the first pixel element data of the selected 4×4 sub block, row-by-row and pixel-by-pixel inputting the first sector of the SSW in the corresponded SSW into the second input end of $PE_r$ and the first input end of $MUX_h$, where r is an integer larger than or equal to −n but less than −i; and
- according to the clock signal timing, as inputting the first pixel element data of the first sector of the SSW in the corresponded SSW plus a delay of (n+2) clock cycles, row-by-row and pixel-by-pixel inputting the second sector of the SSW in the corresponded SSW into the second input end of $PE_s$ and the second input end of $MUX_h$, where s is an integer larger than i but less than or equal to n.

17. The operating method of motion estimation circuits as recited in claim 16, further comprising:
- controlling $MUX_{-1}$, for $MUX_{-1}$ to select and output the second input end signals within at least one clock cycle time following every (n+2) clock cycles from inputting the first pixel element data of the second sector of the SSW up and for $MUX_{-1}$ to select and output the first input end signals during the rest time;
- controlling $MUX_0$, for $MUX_0$ to select and output the second input end signals within at least two clock cycle time following every (n+2) clock cycles from inputting the first pixel element data of the second sector of the SSW up and for $MUX_0$ to select and output the first input end signals during the rest time; and
- controlling $MUX_1$, for $MUX_1$ to select and output the second input end signals within at least three clock cycle time following every (n+2) clock cycles from inputting the first pixel element data of the second sector of the SSW up and for $MUX_1$ to select and output the first input end signals during the rest time.

18. The operating method of motion estimation circuits as recited in claim 16, further comprising a step for each of the processing elements to conduct a SAD computation according to the clock signal timing.

19. The operating method of motion estimation circuits as recited in claim 18, further comprising the steps for each of the processing elements to one-by-one compute, register and accumulate the SAD values on each the 4×4-pixel sub block of the current block and the corresponded 4×4-pixel block in the search window respectively and for each of the processing elements to output the SAD values of the current block and the corresponded block in the search window respectively.

20. The operating method of motion estimation circuits as recited in claim 16, used for a video processing, wherein the current block is a partial block in a current frame to be matched in the video processing, and the search window locates in a previous frame and includes a same-sized partial block as the current block with a position corresponding to the position of the current block in the current frame.

* * * * *